Figure 1:
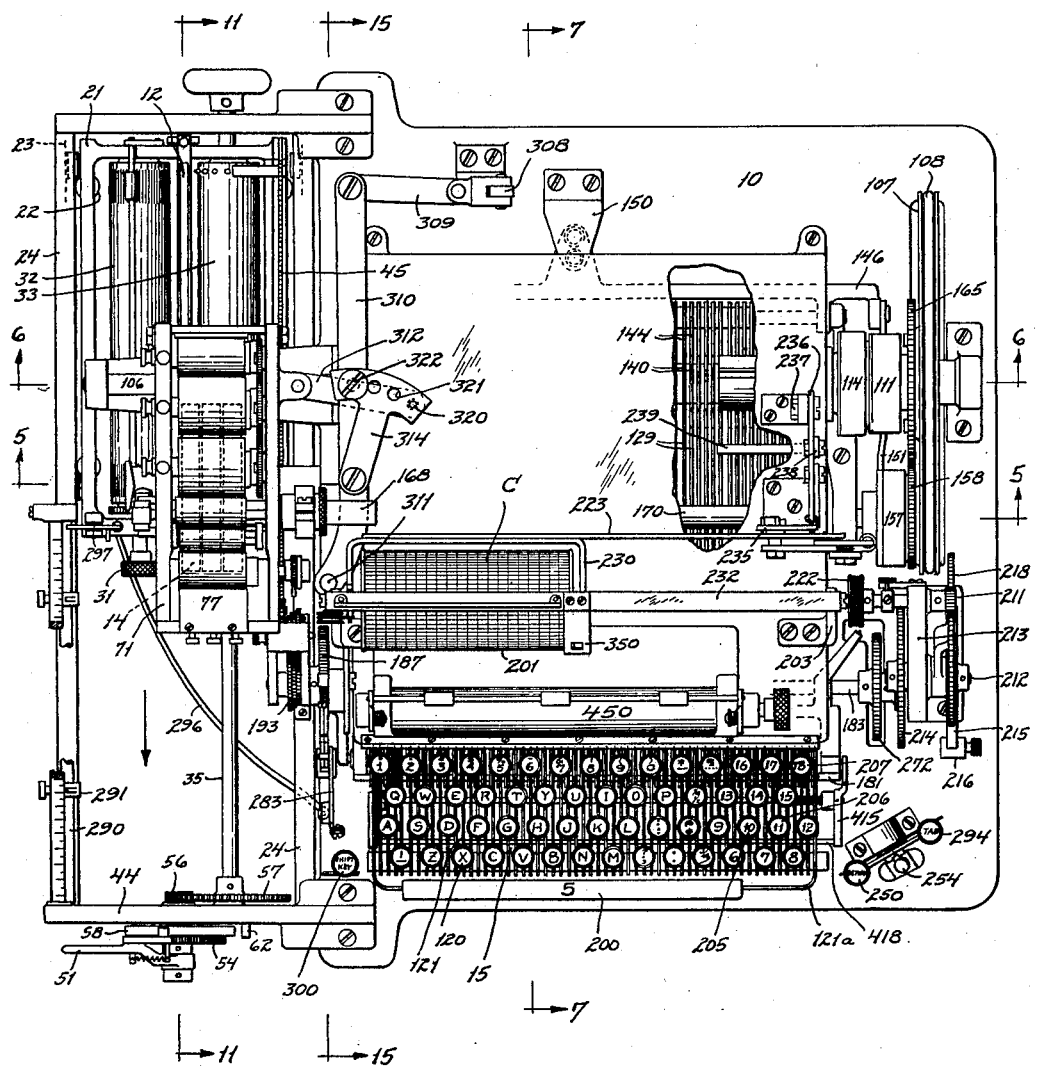

July 11, 1939.   C. CHISHOLM   2,165,223
POWER-OPERATED TYPEWRITER
Filed Feb. 5, 1936   11 Sheets-Sheet 1

July 11, 1939. C. CHISHOLM 2,165,223
POWER-OPERATED TYPEWRITER
Filed Feb. 5, 1936 11 Sheets-Sheet 3

July 11, 1939.   C. CHISHOLM   2,165,223
POWER-OPERATED TYPEWRITER
Filed Feb. 5, 1936    11 Sheets-Sheet 7

Inventor
Clifton Chisholm
By Baker, Golnick & Mearn
Attorneys

July 11, 1939.  C. CHISHOLM  2,165,223
POWER-OPERATED TYPEWRITER
Filed Feb. 5, 1936  11 Sheets—Sheet 8

Inventor
Clifton Chisholm,
By Bates, Golrick & Teare,
Attorneys

July 11, 1939. C. CHISHOLM 2,165,223
POWER-OPERATED TYPEWRITER
Filed Feb. 5, 1936 11 Sheets-Sheet 9

INVENTOR.
Clifton Chisholm
BY
Bates, Golrick & Fears
ATTORNEYS.

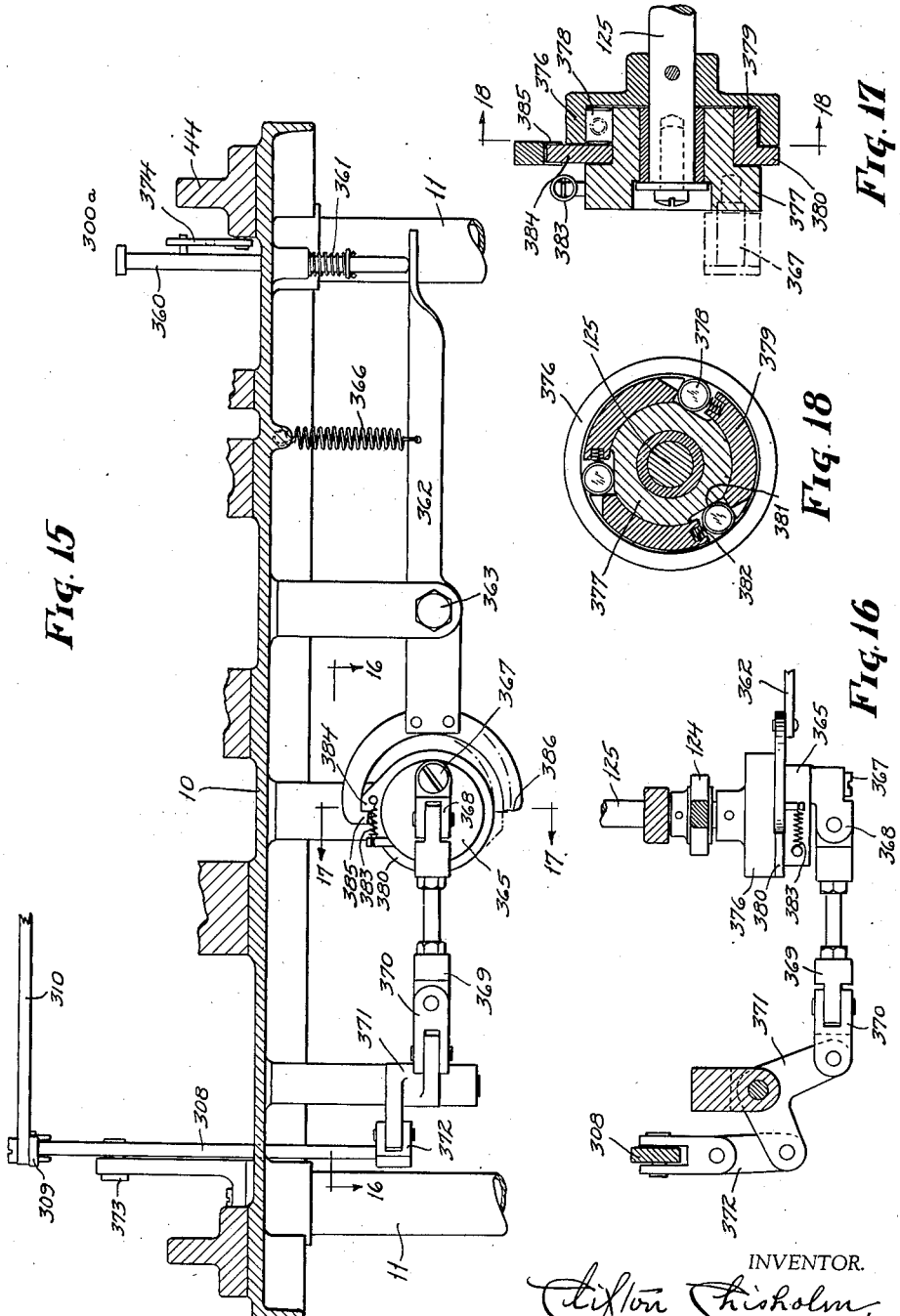

July 11, 1939.    C. CHISHOLM    2,165,223
POWER-OPERATED TYPEWRITER
Filed Feb. 5, 1936    11 Sheets-Sheet 11
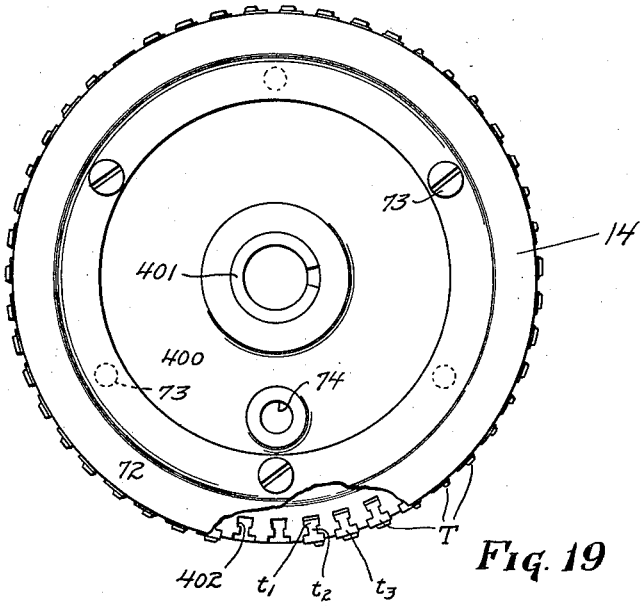
Fig. 19
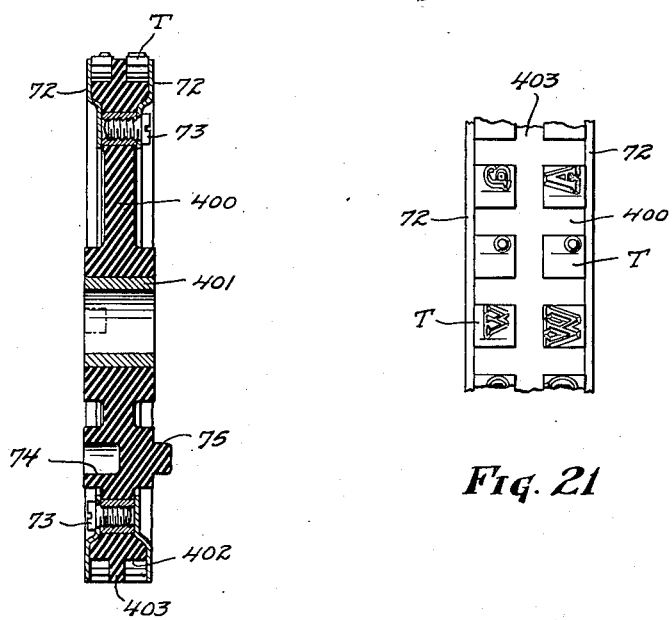
Fig. 20
Fig. 21
INVENTOR.
Clifton Chisholm,
BY
Bates, Goldrick & Dean,
ATTORNEYS.

Patented July 11, 1939

2,165,223

UNITED STATES PATENT OFFICE 2,165,223

POWER-OPERATED TYPEWRITER

Clifton Chisholm, Cleveland, Ohio, assignor of thirty-five per cent to Henry C. Osborn, Cleveland, Ohio Application February 5, 1936, Serial No. 62,467

8 Claims. (Cl. 197—84)

This invention relates to a printing or typewriting machine of the keyboard type for the production of copy for subsequent reproduction in quantities. More specifically, it is the general object of the invention to provide an improved keyboard printing machine to enable the operator to produce a clear, distinct and justified copy, which may be utilized in a reproducing process other than letter-press printing, for producing copies in simulation of letter-press printing. Such reproduction, for instance, may be planographically, hectographically, or by stencil, but is preferably accomplished by photographic transfer to a printing plate which is used in an offset planographic printing machine.

My invention contemplates the provision of a machine having a plurality of spacing keys or bars, each key or bar being so arranged as to space the words a different distance from each other, as, for instance, a twelve-unit space bar, a ten-unit space bar, or an eight-unit space bar. In using my machine the operator will type or print a line in the usual manner using a standard space bar. Mechanism is provided which is dependent upon the difference in length between the printed line and a standard line, and the total number of spaces in the typed line to indicate to the operator which space keys or bars should be used when retyping the line to produce a standard or justified line. The operator then types this information at the end of the printed line and proceeds to type the next line using the same procedure. These typed lines are then removed from the mechanism and reprinted using those space bars or keys indicated at the end of the respective lines. These reprinted lines are then removed from the machine and utilized in the usual manner to form a printing member.

One of the objects of this invention is to provide a mechanism which will facilitate the operation above set forth and enable the operator to readily produce justified copy.

A further object of the present invention is to provide a printing machine of the keyboard type with an improved operating mechanism, which will be operated by suitable power mechanism and will be so arranged as to minimize the work done by the keys themselves, thereby increasing the speed and accuracy of the mechanism.

Other objects of the invention will become more apparent from the following description, reference being had to the accompanying drawings, in which I illustrate a preferred embodiment of the invention. The essential characteristics of the invention will be summarized in the claims.

Figure 2:
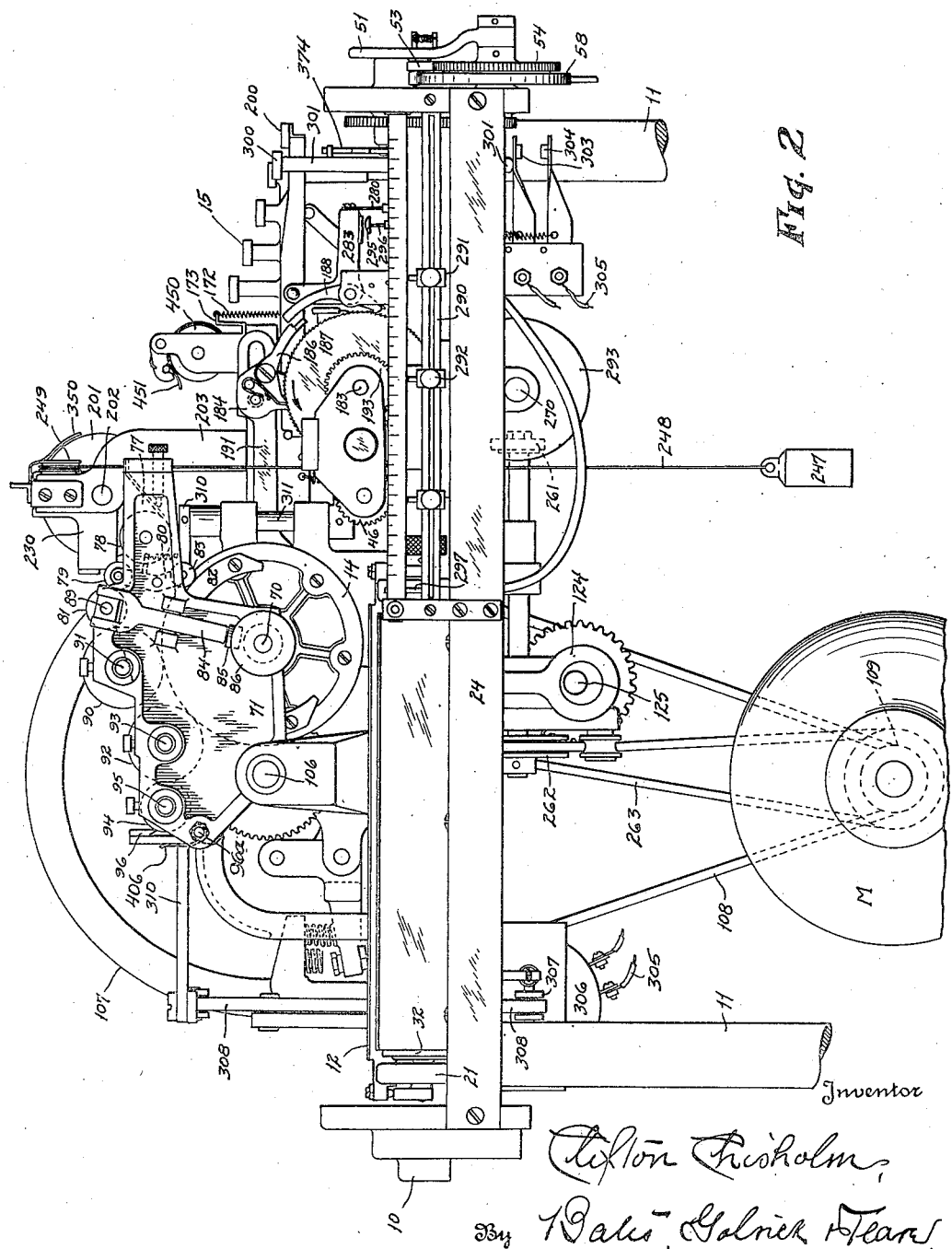
Figure 3:
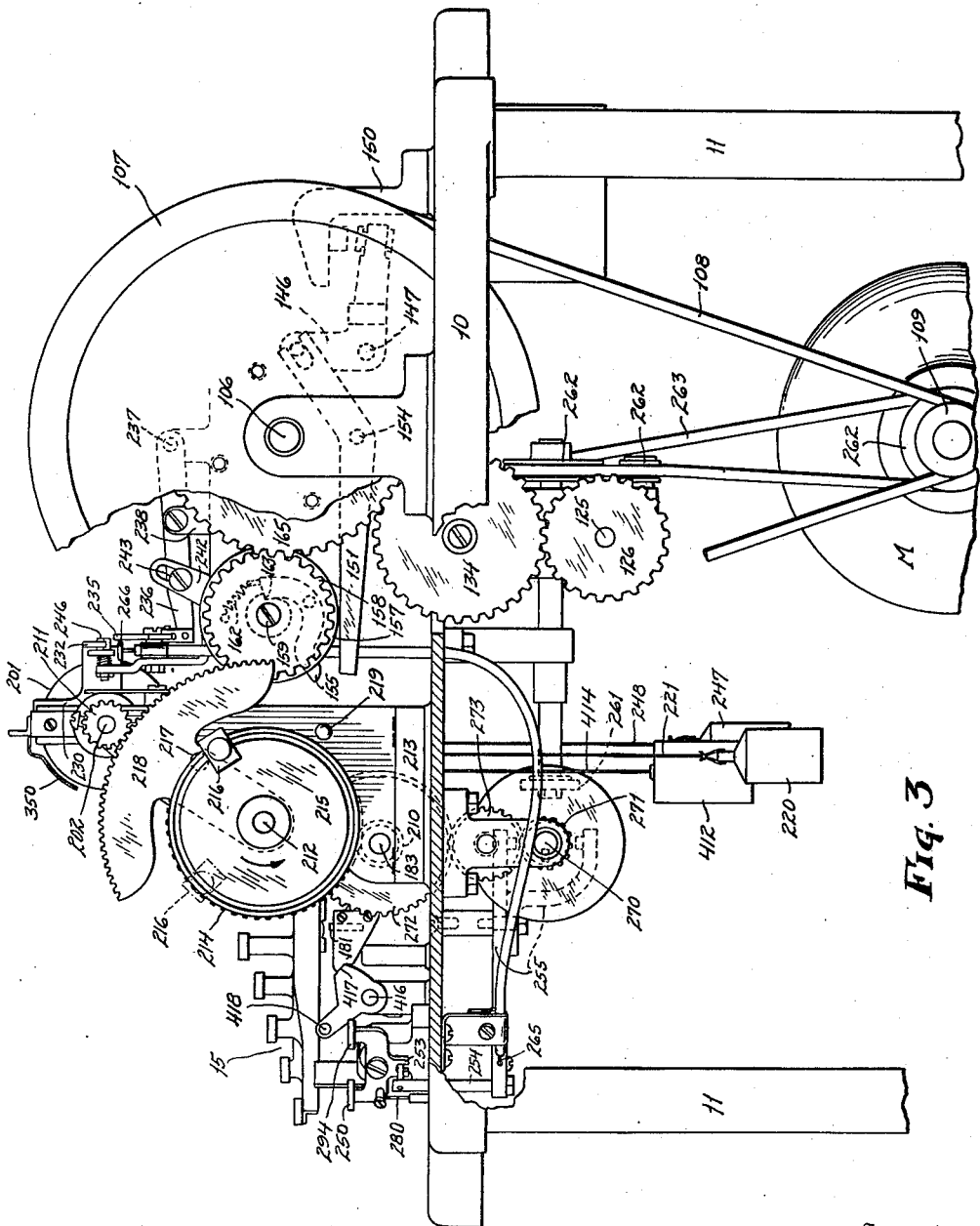
Figure 4:
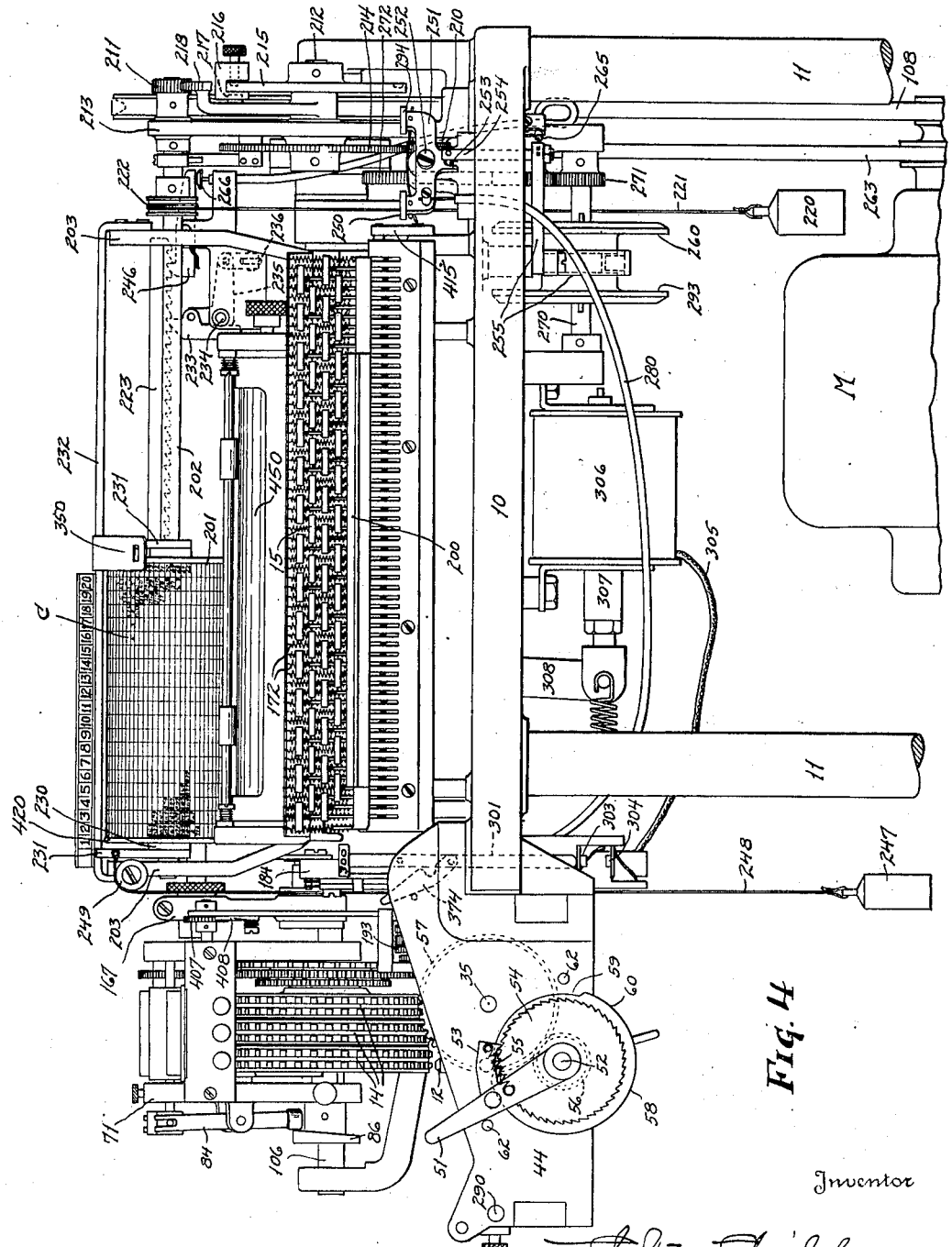
Figure 5:
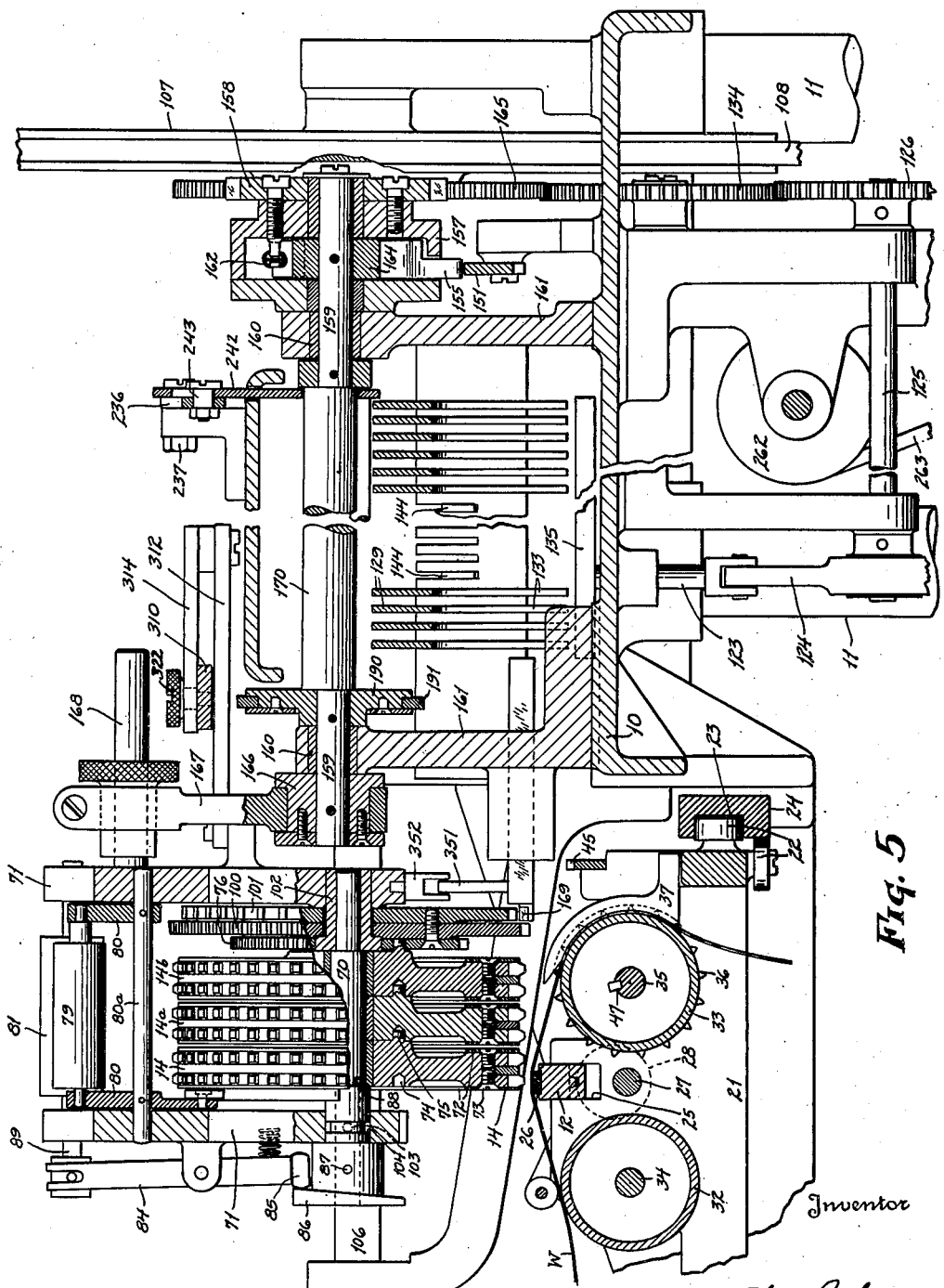
Figure 6:
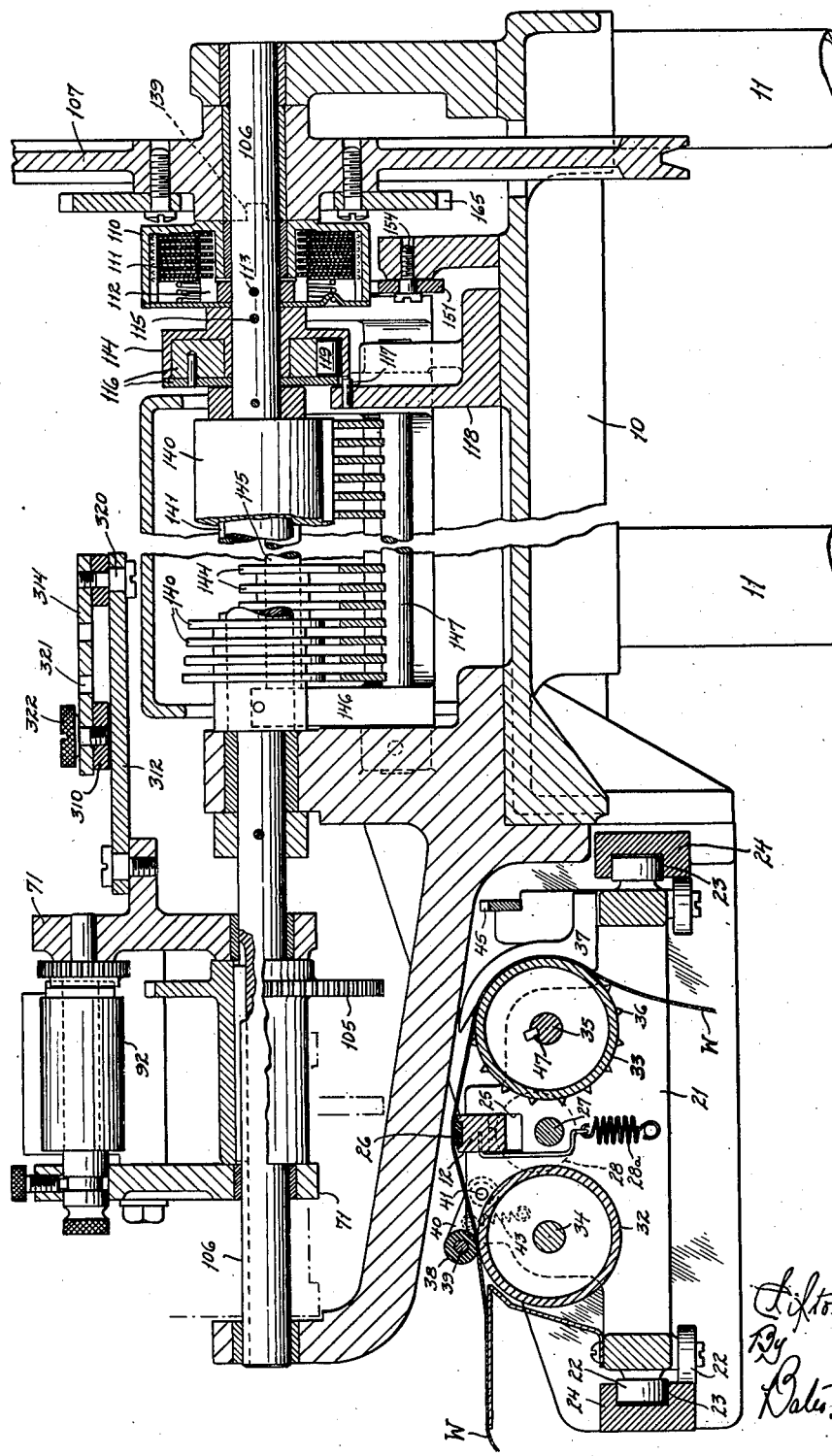
Figure 7:
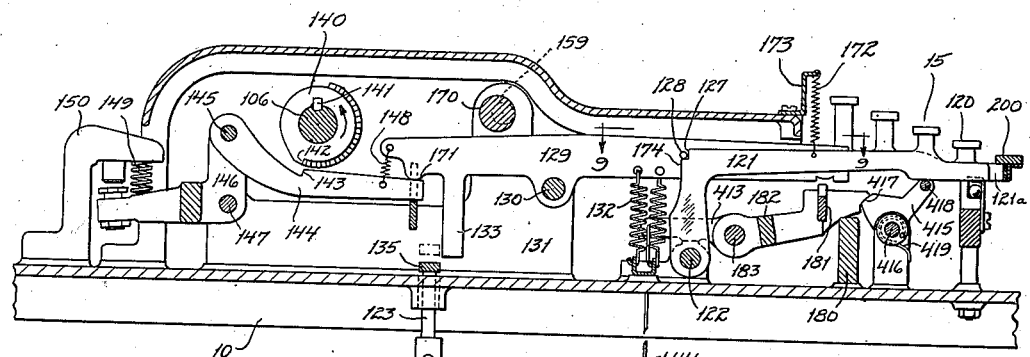
Figure 8:
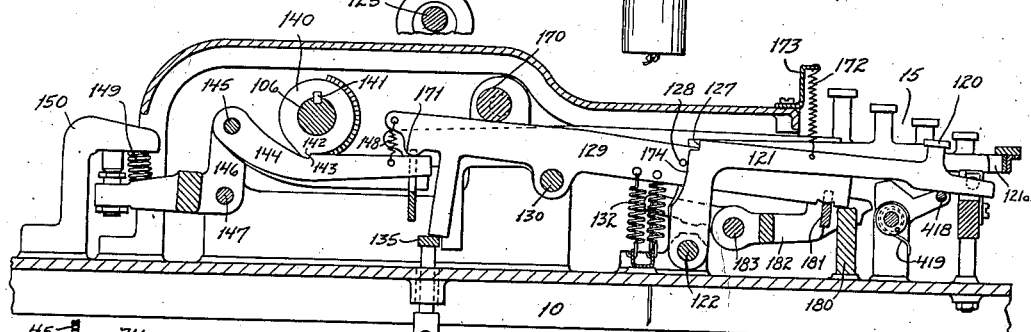
Figure 9:
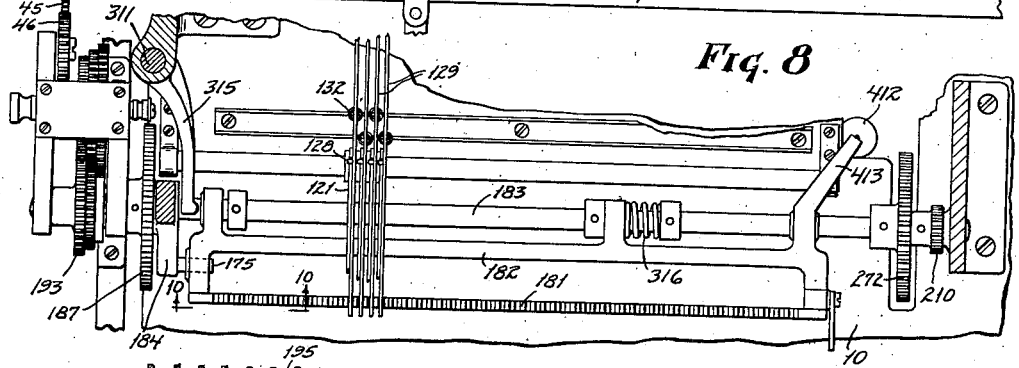
Figure 10:
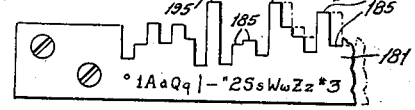
Figure 11:
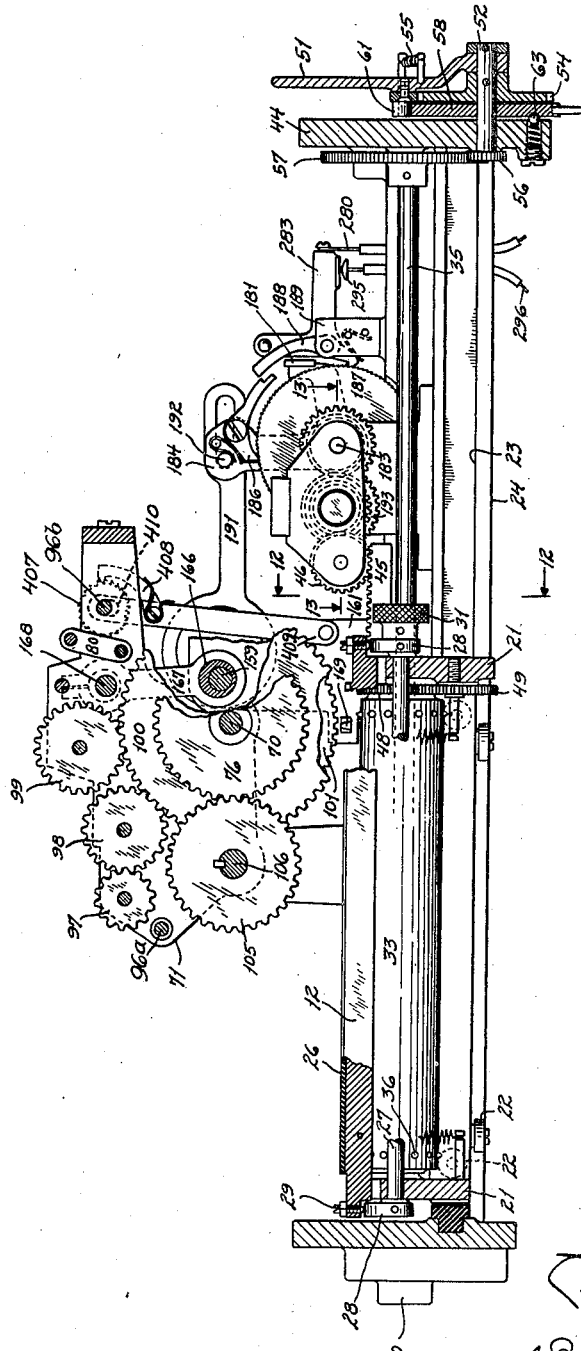
Figure 12:
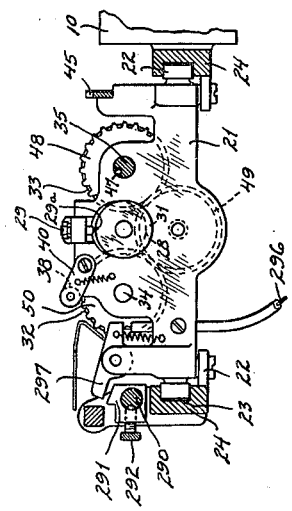
Figures 13, 14:
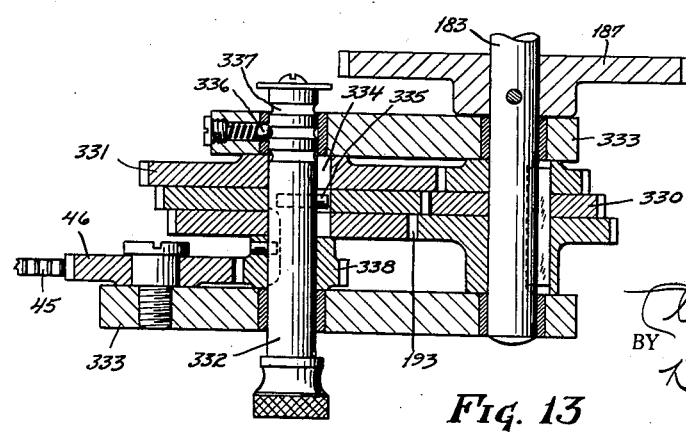

In the drawings, Fig. 1 is a plan view of a machine embodying my invention; Fig. 2 is a side elevation looking at the left-hand side of Fig. 1; Fig. 3 is a side elevation looking at the machine from the right-hand side of Fig. 1; Fig. 4 is a front elevation of the machine illustrated in Fig. 1; Figs. 5 and 6 are transverse sectional views on an enlarged scale, the plane of the sections being indicated by the lines 5—5 and 6—6 on Fig. 1; Fig. 7 is a longitudinal sectional view, as indicated by the line 7—7 on Fig. 1; Fig. 8 is a view similar to Fig. 7, but illustrating certain of the parts in a different position; Fig. 9 is a fragmentary horizontal section, the plane of the section being indicated by the line 9—9 on Fig. 7; Fig. 10 is a detail section as indicated by the line 10—10 on Fig. 9; Fig. 11 is a vertical section taken in the plane of the lines 11—11 on Fig. 1; Fig. 12 is a sectional detail as indicated by the line 12—12 of Fig. 11; Fig. 13 is a sectional detail, the plane of the section being indicated by the lines 13—13 on Fig. 11; Fig. 14 is a diagrammatic illustration of the justification chart; Fig. 15 is a sectional detail of a modified form of mechanism for shifting the carriage and type wheels from upper to lower case characters and vice versa, the general plane of the section being indicated by the lines 15—15 on Fig. 1; Figs. 16 and 17 are detail sections, as indicated by the correspondingly numbered lines on Fig. 15; Fig. 18 is a detail section as indicated by the lines 18—18 on Fig. 17; Fig. 19 is a side elevation of a type wheel removed from the machine; Fig. 20 is a section as indicated by the line 20—20 on Fig. 19; Fig. 21 is a fragmentary face elevation of a type wheel.

Referring now to the drawings, and especially to Fig. 1, it will be seen that my improved typewriting machine comprises a frame 10, supported by suitable legs or standards 11 and carrying a platen 12, across which a work sheet or web W is fed by a suitable paper feeding mechanism. Above the platen 12 are mounted a series of type wheels 14, each wheel carrying on its periphery an entire font of type. One wheel may carry, for instance, an eight-point type, and another wheel a ten-point type, etc. The type wheels are arranged to be selectively positioned to enable the printing from a selected font of type.

The type wheel which is in position immediately above the platen is rotated under control of a key board 15, to bring the desired character or type of its font into printing position. The key board 15 also controls a mechanism which, when a type wheel has been brought to rest with the selected character in printing position, causes the wheel to move bodily, bringing the selected type thereon into printing contact with the work.

After the character has been impressed on the work, the latter is advanced a distance which is determined by the width of the character impressed. The total advance of the work, as well as the total number of spaces between the words of a set line, control the positioning of a justifying scale carried by a drum 201 mounted on the frame.

During the first typing or printing of a line, the operator uses a standard space bar 200, to advance the work without making impression thereon. When the end of the line is reached, the operator may inform himself, by inspecting the justifying scale C, what space bars or what width of spaces should be used in place of the standard space bar to justify the printed line. This information is printed at the end of the line and when all lines have been typed the copy is reprinted, the operator using the space bar indicated by the information printed at the end of the respective lines, as directed by the justifying scale, instead of the regular space bar.

The platen 12 and paper feed mechanism are best illustrated in Figs. 1, 2, 5, 6, 11 and 12. As there shown, the paper feed mechanism and the platen are mounted in a rectangular frame 21, which is provided with guiding rollers 22, arranged to coact with longitudinally extending horizontal guideways 23, formed in a frame member 24, secured to the main frame 10 at the left-hand side thereof.

As illustrated, the platen comprises a longitudinally extending bar, which is mounted in vertical guideways or slots 25, so that it may be adjusted up and down to regulate the printing pressure and to facilitate the positioning of the paper or work W in the feeding mechanism. The platen is provided with a rubber or similar platen surface 26, which is secured to the platen 12 in the usual manner.

The vertical adjustment of the platen is accomplished by the rotation of a shaft 27, which carries at its opposite ends cams 28, arranged to coact with adjusting screws 29 carried by the platen, as shown in Fig. 11. Suitable springs 28a, interposed between the platen and the frame 21, maintain the platen in engagement with the cams 28. The adjusting screws serve to regulate the printing pressure, whereas the cam serves to move the platen a considerable distance away from the type wheels 14, which are located thereabove, to permit the initial feeding of a worksheet W to the paper-feeding mechanism. The cams 28 are preferably provided with recesses 29a, hence, by turning the knob 31, (Fig. 11) the operator may move the platen away from the type wheels and back again without changing its adjustment.

The paper feeding mechanism comprises a pair of rolls 32 and 33, mounted on respective shafts 34 and 35, which are journalled in the end plates of the platen frame in any suitable manner. The roll 33 may be provided at its ends, as shown in Fig. 6, with a plurality of radially extending projections 36, arranged to engage suitable perforations formed in the edges of the worksheet W, so as to accurately position the paper relative to the platen and previously typed lines. As shown in Fig. 6, the worksheet passes around the roll 33 and is maintained in engagement with the projections 36 thereof by suitable guide members 37.

The worksheet passes from the roll 33 across the platen 12 to the roller 32 with which it is held in contact by suitable rollers 38. These rollers are mounted on a shaft 39 carried by levers 40, which are pivotally mounted as at 41 to the end members of the platen frame 21. Suitable springs 43 serve to maintain the rollers 38 in engagement with the work W, as shown in Fig. 6.

The platen bar surface 26 lies above the top surface of the paper feed rolls 32 and 33, and is of sufficient width to accommodate but one letter. The worksheet W therefore passes upwardly from the roll 33 to the platen and downwardly to the roll 32. Hence, I may place the circumferential rows of printing characters relatively close together without danger of smudging the worksheet.

The mechanism is arranged to type lines of printing characters in a direction parallel with the platen, that is, from the front to the rear of the machine. The platen carriage, together with the paper feed mechanism, just described, is therefore movable lengthwise of the platen in the guideways 23, heretofore described, and is advanced for character feeding in the direction of the arrow of Fig. 1. As shown in Figs. 1 and 6, the paper feed carriage 21 is provided with a rack 45, arranged to be engaged by a pinion 46, hereinafter to be described in detail, but which is mounted on the main frame 10 and is periodically rotated predetermined angular distances to advance the carriage to the right in Fig. 11, for letter or character feeding of the paper. The return of the carriage is accomplished, as will be hereinafter more fully described, by reversing the direction of rotation of the pinion 46.

The work sheet is advanced to feed it from one printing line to another by a manual operation, which rotates the paper feed rolls 32 and 33, (Fig. 6) in a counter-clockwise direction a distance equivalent to the desired spacing of lines. As shown in Figs. 11 and 12, the feed roll shaft 35 extends the full length of the frame bracket 24, which supports the platen carriage guideway 23, and is provided with a key-way 47, which, together with a key carried by the roll 33, provides in effect a splined driving connection between the shaft 35 and the roll 33.

The roll 32 is driven from the roll 33. Secured to the roll 33 is a pinion 48, which meshes with an idler pinion 49, carried by the carriage 21, and which, in turn, engages a pinion 50, secured to the roll 32.

The shaft 35 is rotated to advance the work W manually by the operator. For this purpose, a lever 51 is pivoted to the bracket 44, as on a pivot shaft 52, and is provided with a pawl 53 normally held in engagement with a ratchet 54 by a suitable spring 55. The clockwise movement of this lever (Fig. 4) causes a partial rotation to be imparted to the ratchet, which is drivingly connected, as shown in Fig. 11, with a pinion 56, which meshes with a gear 57, secured to the forward end of the paper feed roll shaft 35.

The spacing between the lines is controlled by the amount of movement imparted to the ratchet. As illustrated in Figs. 4 and 11, I journal a cam disc 58 on the pivot shaft 52. This cam disc is provided with a recess portion 59, and a high or cam portion 60, which latter portion is arranged to engage a pin 61, carried by the pawl 53 and raise the pawl out of engagement with the ratchet. This, therefore, adjusts the effective stroke on the pawl. The actual stroke of the pawl 53 is limited by a pair of pins 62, which are carried by the bracket 44 and project into the path of the lever 51, as indicated on Fig. 4. The cam 58 is retained in any selected position by a spring-pressed ball 63, (Fig. 11), which is mounted in the frame 44 and engages any one of a series of recesses in the cam disc.

The type wheels are best shown in Figs. 2, 4, 5 and 19 to 20. In the present embodiment of the invention I have illustrated three type wheels 14, each of which is mounted on a shaft 70, which is carried by a bracket 71. This bracket is swingably mounted on a shaft 106, which is journalled in the main frame 10. Each type wheel carries on its periphery two annular sets of type. The type in the left-hand band or ring of type is shown in Fig. 5, and comprises the upper case type, whereas the right-hand band of the same wheel includes the lower case type.

In Fig. 5 I have indicated the type wheels, as 14, 14a and 14b. The type wheel 14 may carry, for instance, eight-point type, the type wheel $a$, ten-point type, and the type wheel $b$, twelve-point type. One face of each type wheel is provided with a recess 74, and the other face is provided with a pin 75, adapted to engage the corresponding recess of the next adjacent type wheel. The pin 75 of the type wheel furthest to the right, (Fig. 5) engages a similar recess in a gear 76, which is mounted on the shaft 70. Thus, when the gear is rotated the type wheels are rotated in unison therewith. The amount of such rotation is controlled by the key board, as will be hereinafter more fully described.

The type wheels may be made of metal, preferably a light metal such as an aluminum alloy, or of Bakelite, hard rubber or some other similar non-metallic composition, as indicated in Fig. 20. Each type wheel comprises a body section 400 provided with a suitable hub bushing 401. The periphery of the type wheel is provided with a series of key slots 402, arranged to receive type T having enlarged feet $t'$ and heads $t^3$ joined together by a web $t^2$. The slots 402 are arranged to embrace the heads and web of the type, the heads of which project outwardly from the periphery of the type wheel, as shown in Fig. 19. The type wheel illustrated in the drawings is provided with two series of type retaining slots 402, which extend from opposite faces of the wheel toward the center, where they are separated by a ring 403 preferably formed integral with the body of the wheel.

The type T are retained against radial movement by their enlarged feet $t'$ and are inserted in the wheel by sliding them axially relative to the wheel. The type are restrained against axial movement by retaining plates 72, which are secured to opposite faces of the type wheel by suitable screws 73.

The type wheels are supplied with a suitable ink fountain, which is best illustrated in Figs. 1, 2, 5, 6, and 11. As there shown, the ink fountain is mounted on the type wheel bracket 71, and includes the usual fountain trough 77, in which a suitable fountain roll 78 is intermittently rotated, as will be hereinafter described. A ductor roll 79 is mounted on a pair of levers 80, which are pivotally mounted on a shaft 80a, journalled in the bracket 71. The ductor roll is alternately brought into engagement with the fountain roll 81 and a reciprocating transfer roll 81, by a cam 82, carried on the periphery of one of the type wheels 14, as indicated in Fig. 2, and which cam engages a roller 83, carried by the lower end of one of the levers 80. A suitable spring serves to maintain either the roller 83 in engagement with the cam 82, or the ductor roll 79 in engagement with the fountain roll 78.

The roll 81 is reciprocated to aid in the distribution of ink, in a direction parallel with the axis of the type wheels. As shown in the drawings, the roll 81 is secured to a shaft 89, which is rotatively and slidably mounted in the bracket member 71. The shaft 89, as shown in Fig. 5, extends to the left of the left-hand bracket member 71 and is engaged by a forked end of a lever 84, which is pivoted intermediate its ends as at the bracket member 71. At its lower end the lever 84 is provided with a roller 85 arranged to engage a cam 86, which is drivingly secured to the shaft 70 by a suitable pin 87. The shaft 70 is driven by a lug 88, projecting from an enlarged portion of the shaft inwardly toward and into engagement with the walls of a suitable recess, (not shown) in the type ring. A spring is interposed between the lower end of the lever 84 and the bracket 71 to maintain the roller 85 in engagement with the cam 86.

The transfer roll 81 transfers the ink from the ductor roll 79 to a form roll 90, carried by a suitable shaft 91, journalled in the bracket 71 in the usual manner. Excess ink on the type wheels is removed by a cleaning roll 92, carried by a shaft 93, journalled in the bracket 71. Ink is transferred from this roll to a roll 94, carried by a shaft 95 journalled in the bracket 71. The ink is removed from the roll 94 by a suitable scraper 96 pivotally mounted on a shaft 96a and retained in contact with the roll by a suitable spring 96b. Any means, such as a reservoir (not shown) may be used to prevent the excess ink from reaching the various parts of the mechanism. However, I have found that only a small amount of ink will accumulate on the scraper and hence this need be wiped only occasionally by the operator. Reference is made to my pending application Serial No. 230,034, filed September 15, 1938, for claims on the type cleaning mechanism shown.

The inking mechanism rolls 94, 92 and 90 are positively driven by suitable gears 97, 98 and 99 secured to the respective roll shafts. The gear 97 meshes with the gear 98 which, in turn, is driven by a gear 100, loosely journalled on the shaft 70, and which is drivingly secured to the type wheel driving gear 76. The gear 99, which drives the roll 90, is engaged directly by the gear 100. Hence, the respective rolls are driven whenever the type wheels are rotated.

It will be noted from Fig. 5 that I have so arranged the type wheels that they may be readily removed without disturbing the driving gears 76 or 100, or a type wheel registering gear 101, hereinafter to be more fully described. To this end the gears 76, 100 and 101 are mounted on a bushing or sleeve 102, carried by the right-hand member of the frame bracket 71, which sleeve, in turn, rotatively supports the shaft 70. Hence, the shaft 70 may be withdrawn without disturbing the gears. The shaft 70 is normally held in operative position by a set screw, indicated at 103, (Fig. 5), as carried by the left-hand frame member of the bracket 71 and arranged to engage an annular recess 104 in the shaft 70, thereby preventing its axial movement.

The type wheels 14 are normally rotating and are brought to a stop with a selected character in the printing position by the operation of the key board, as will be hereinafter more fully described. As illustrated in Fig. 11, the type wheel driving gear 76 meshes with a gear 105, which has a splined driving connection with the shaft 106, on which the bracket 71 is pivotally mounted. This shaft 106 is normally rotated through the medium of a driving belt 108, (Fig. 3) connecting a motor pulley 109, with a pulley 107, which is rotively mounted on the right-hand end of the shaft 106, as illustrated in Fig. 6.

The pulley 107 is drivingly connected, by a suitable clutch formation, with one member 110 of a frictional driving clutch 111, the other member 112 of which is pinned to the shaft 106, as indicated at 113. Back lash of the shaft 106 is prevented by a roller clutch, one member 114 of which is secured to the shaft 106 by a pin 115, and the other member 116 of which is held stationary by a pin 117, carried by a frame bracket 118. This clutch is of the usual type and hence is not described in detail. Suffice it to say that it is of the type wherein, as long as the shaft rotates in one direction, the clutch rollers 119 are free to move about the axis of the shaft, but whenever the shaft tends to rotate in the other direction, these rollers lock the two clutch members together, thereby locking the shaft against rotation.

As heretofore mentioned, the type wheel, which is above the platen 12, is brought to rest with a selected type in printing position, that is, immediately above the platen bar or at the lowermost point on the type wheels, so that consequent upon the rocking of the type wheel carriage or bracket 71 above its axis, namely the shaft 106, the lowermost type will leave an impression on the work sheet W, which lies across the platen as illustrated in Fig. 6.

The stopping of the rotation of the type wheels is under direct control of keyboard 15. This keyboard and the control mechanism associated therewith is best illustrated in Figs. 1, 2, 3, 4, 5, and 7 to 9, inclusive. Referring specifically to Fig. 1, the keyboard 15 includes a series of character keys 120 which, for illustrative purposes, are outlined on Fig. 1 with a pair of adjacent circles; a standard space bar 200; a series of special space keys 206, a shift key 300, a tabulator key 294 and a carriage return key 250.

In Fig. 1, the standard space bar is shown as a longitudinally extending bar immediately in front of the character keys of the keyboard. The special space keys 206, the purpose of which will be hereinafter fully explained, are shown as being similar to the character keys. These space keys, however, for illustrative purposes, are outlined with a heavy black circle, to distinguish them from the character keys. The shift key 300 is shown at the left-hand side of the keyboard. The tabulator and carriage return keys are mounted at the right-hand of the keyboard and are inscribed according to the operation performed by them.

The keyboard is of the power type so that the depression of any of the character keys initiates mechanism to control the stopping of the type wheels, as about to be described. It should be noted, however, that such power operation is not claimed herein, but in my copending application Serial No. 110,085, filed November 10, 1936, while the means for controlling the key levers themselves is claimed in my copending application Serial No. 154,790, filed July 21, 1937. Each character key 120 is, as shown in Fig. 8, supported by an upstanding lug or arm of one member 121 of a compound key lever. The members or levers 121 of all key levers are pivoted to a common shaft 122, mounted in suitable frame brackets. The normal position of the key lever members 121 is shown by the lever 121 in Fig. 7. Here it will be noted that the key lever member 121 is provided with a notch 127, which provides a seat for a pin 128, carried by the other member 129 of its respective key lever. The key lever members 129 are pivotally mounted on a common shaft 130 carried in frame brackets 131. The pins 128 are normally maintained in contact with the notches and their respective key levers 121 by a series of springs 132 which are interposed between the levers 129 and a suitable frame member.

The arrangement of the key mechanism is such that the operator need only initiate the depression of a key, power mechanism, operated by the motor M, heretofore described, serving to complete the depression. As illustrated in Figs. 7 and 8, each lever 129 is provided with a downwardly extending projection 133. When the operator depresses a finger key 120, an amount sufficient to cause the notch 127 of its respective key lever member 121 to disengage the pin 128 of its corresponding lever member 129, the projection 133 of such lever will be moved, from the position illustrated in Fig. 7, to a position where it will be engaged by a vertically reciprocating bar 135. This bar is reciprocated by a plunger 123 slidably mounted in the frame 10 and joined by a connecting rod 124 with a crank or eccentric carried by a shaft 125. The shaft 125 is driven by a gear 126 which meshes with an idle gear 134 and which in turn is driven by a gear 165 secured to the driving pulley 107. The first upward movement of the bar, following the depression of a key by the operator, will cause the bar to contact the projection 133 of the partially depressed key lever member and positively rock it to a fully depressed position.

The movement of any one of the bars 129 from the position shown in Fig. 7 to the position shown in Fig. 8, stops the type wheel with the character which corresponds to the character represented by such key lever, in printing position. This movement of the key lever member 129 also releases for action a mechanism which causes the type wheels to be rocked about their pivot shafts 106, to cause the selected character to be impressed upon the work W. This movement also causes the platen and paper carriage to be advanced a distance equivalent to that required by the selected character, immediately after the impression of such character takes place, thereby positioning the work sheet for the impression of the next succeeding character.

The rocking of any key member 129 stops the type wheels by the operation of a corresponding stop lever 144. As shown in the drawings, and especially Figs. 1, 7 and 8, the shaft 106, which drives the type wheels, is provided with a series of discs 140 which are drivingly secured thereto by a key 141. There is one disc for each key lever mechanism 121, 129, such disc lying in the same vertical plane as the key lever member 129. Each disc 140 is provided with a shoulder 142, and it will be noted from Figs. 7 and 8 that these shoulders 142 hold different angular positions relative to the axis of the shaft 106, such positions being equal to the angular positions of the type about the periphery of the type wheels. Each shoulder 142 is arranged to be engaged by an abutment 143 of its respective stop lever 144. The latter levers are pivoted as at 145 to a bell crank 146, which is, in turn, pivoted to the frame bracket 131, as at 147.

The stop members 144 are normally held out of the path of the shoulders of their respective discs 140 by the key lever members 129 heretofore described. When, however, a key 120 is depressed, the corresponding lever 129 is rocked in clockwise direction by the reciprocating bar 135, and causes the spring 148, interconnecting such lever and its respective stop member 144, to raise the stop into contact with the path of the shoulder of its respective disc 140. Hence, the rotation of the shaft 106 will be stopped when the shoulder 142 of such disc engages the abutment 143 of the corresponding stop member 144. The friction clutch 111 heretofore described, permits the stopping of the shaft 106 without interference with the operation of the power mechanism or damage to the parts. This stopping of rotation of the shaft 106 stops the type wheel with the selected character in printing position, which character is represented by the key 120 which was depressed.

The depression of the key 120 also releases a mechanism which causes the printing action. As shown in Figs. 7 and 8, it will be noted that when a disc 140 engages a stop lever 144, it rocks the bell crank 146 about its pivot 147, against the action of a compression spring 149 interposed between the bell crank and a stationary frame member 150. The movement of this bell crank rocks a lever 151 (Fig. 3) about its pivot 154, withdrawing the left-hand end of said lever (Fig. 3) from the path of a latch 155, which is pivoted as at 156 to a clutch member 157, drivingly secured to a gear 158, both of which are rotatively mounted on a shaft 159, journalled in suitable bearings 160 in upstanding frame bracket members 161.

The withdrawal of the lever 151 permits a spring 162 to draw the latch into engagement with an abutment 163 formed on a collar 164, which is pinned to the shaft 159, thereby drivingly connecting the shaft 159 with the gear 158. This gear meshes with the gear 165 which is drivingly connected to the driving pulley 107. This clutch is of the usual single revolution type, and when the shaft has made one complete revolution, the latch 155 will be cammed out of engagement with the collar 164, by the lever 151, which, at that time, will have been returned to its normal position.

The shaft 159, during the first-half of its revolution, acts to rock the type wheels to cause an impression to be made upon the work sheet W. As shown in Fig. 5, an eccentric bushing 166 is secured to the left-hand end of the shaft 159, and through a connecting rod 167, which is interconnected between the eccentric and a pin 168 integrally carried by the type wheel carriage 71, causes the carriage to be rocked about its pivot shaft 106, thus causing an impression to be made.

The rocking of the carriage 71 to make an impression accurately positions the angular position of a type which is substantially in the printing position. As illustrated in Figs. 5 and 11, an indexing gear 101 is mounted on the bushing 102 and, as heretofore explained, is arranged to rotate as a unit with the type wheels. As the carriage is swung downwardly about its pivot, this gear engages a precisioning dog 169 carried by a stationary frame bracket 161. This engagement takes place before the type strikes the work and is effective to accurately index the type wheels. The movement of the type wheels, due to this precisioning mechanism, is comparatively little, and is entirely compensated for by back lash in the gearing and other mechanism, hence may be accomplished without damage.

The rocking of the type carriage 71 to make an impression also causes the movement of the fountain roll 78 of the ink fountain, hence, the ink fountain will not feed a surplus supply of ink to the type wheels. The fountain roll 78 is drivingly secured to a shaft 406 journalled in the carriage 71 as shown in Fig. 11. Drivingly secured to this shaft is a ratchet 407 arranged to be engaged by a spring pressed pawl 408 carried by a lever 409. The lower end of this lever is pivoted to a stationary frame member 161, and at its upper end is provided with a slot 410 through which the shaft 406 extends. Hence, the downward movement of the carriage will cause the pawl to pass idly across the ratchet teeth, the upward movement of the carriage causing the pawl to advance the ratchet. If desired, the usual detent pawl arrangement (not shown) may be used to prevent movement of the ratchet during the idle movement of the pawl 408. Reference is made to my copending application Serial No. 230,034 heretofore referred to for claims on the above described means for rotating the fountain roll.

During the last half of the movement or rotation of the shaft 159, the type wheel is retracted from the work and the paper carriage and platen are advanced into position for the impression of the next character thereon, and the key lever mechanism 121, 129, 144 and 146 is reset to prepare the keyboard for the impression of the next key by the operator. The resetting of the lever mechanism is accomplished by an enlarged eccentric portion 170 of the shaft 159, which overlies the key lever members 129, and consequent upon the rotation of the shaft serves to rock such members in a counter-clockwise direction about their pivots 130, causing a projection 171 of a depressed lever to engage its respective latch member 144 and move it out of engagement with its corresponding disc 140, permitting the spring 149 to return the bell crank 146, as well as the lever 151 (Fig. 3), thereby causing the rotation of the shaft to cease, following the completion of one revolution, as heretofore mentioned.

While the levers 129 are being returned, by the eccentric portion 170 of the shaft 159, to the position shown in Fig. 7, the key lever members 121 are likewise returned. As shown in Fig. 8, each key lever member 121 is provided with a spring 172, which is interconnected between its respective key lever member 121 and a stationary frame member 171. When a key lever member 121 is depressed, its associated member 129 is moved to the position shown in Fig. 7, as heretofore described, whereupon the pin 128 maintains the member 121 depressed by engagement with a surface 174 of such member. When, however, the key lever member is reset or returned to the position shown in Fig. 7, the spring 172 returns the member 121, bringing the recess or notch 127 into engagement with the pin 128 and latching the key lever members 121 and 129 together.

The depression of a key through its control of the shaft 159, also controls the advance of the paper feed and platen carriage. As heretofore explained, the operation of the key serves to cause the shaft 159 to make one complete revolution. During the second half of this revolution, the paper carriage is advanced a distance which is determined by the width of the type, the imprint of which was caused by the operation of the selected key.

When a key is depressed, its key lever member 129 is rocked clockwise about its pivot 130 by the bar 135. This clockwise movement of the key lever 129 is limited by a block 180, secured to the frame 10, as shown in Fig. 7. During its downward movement, the key lever member 129 engages a comb 181 supported by a yoke 182 which is pivotally mounted on a rock shaft 183.

The comb 181 is provided with a series of steps 185 of varying height. The arrangement of these steps is such that various keys lower or rock the comb variable angular distances, the distance depending upon which key is struck. The rocking movement of the yoke 182 is transmitted to a bell crank 184 by a pin 175 (Fig. 9). This bell crank 184 is likewise pivoted to the shaft 183 and carries on its upper end, as shown in Fig. 11, a pawl 186, normally spring-pressed into engagement with a ratchet wheel 187. This ratchet wheel is drivingly mounted on the shaft 183, and hence the angular movement of the yoke 182 draws the pawl idly in a clockwise direction (Fig. 11) a distance determined by the height of the step 185 in the comb, which was struck by the key lever member 129. The movement of the ratchet, during this movement of the pawl, is prevented by a suitable spring-pressed detent pawl 188 carried by a frame bracket 189.

During the last half of the rotation of the shaft 159, an eccentric crank 190, rigidly secured to the shaft 159, causes a connecting arm 191 to advance the ratchet an angular distance equivalent to the distance of movement of the pawl just described. The connection between the crank arm and the bell crank 184 is the usual pin and slot arrangement, as shown in Fig. 11 at 192. The rotary movement of the ratchet 187 is imparted through a series of change speed gears 193 to the carriage progressing gear 46, thus causing the advance of the paper carriage.

The comb is returned to its normal position, shown in Fig. 7, when the key levers are reset, by the connecting rod 191, and overthrow thereof is prevented by a suitable weight 412 (Fig. 7), which is connected to a rearwardly extending arm 413 of the comb by a suitable flexible cord 414, and is retained in such position by a latch 415. The latch 415 is pivoted to the frame 10 as at 416 and has an arcuate face 417 arranged to engage a similarly shaped face of forwardly projecting portion of the comb yoke 182. When a key is depressed, its key lever member 121 acts on a rod 418 carried by the latch and rocks the latch out of engagement with the comb yoke before the latter is engaged by the corresponding key lever member 129, as heretofore described. When the key lever members are returned to their normal position, the latch is moved into reengagement with the comb fork 182 by a suitable spring 419.

The height of the steps 185 in the comb control, as above pointed out, is the distance which the paper carriage is advanced following each impression. This distance is so arranged that it equals the distance required for the character just printed and is one of the factors in determining how the printed line is to be justified when it is retyped. Therefore, the system used in determining the height of these steps will now be explained.

The width of each type used on the type wheel bears a fixed relation to each other type used on the wheel. This width is commonly called the "set size". In designing the type, the width of the basic character of the font, namely, the upper case letter "M", is divided into eighteen equal parts and using one of these parts as a unit of measurement, the widths of all of the remaining characters of the font are determined. For instance, the cap M is preferably three times as wide as either the lower case letters "j" and "f" and twice as wide as the lower case letters "a", "o", "g" or "x". Hence, if the upper case letter "M" is divided into eighteen units, the lower case letters "j" and "s" each comprise six units, while the lower case "a", "o", "g" and "x" will be nine units wide. Other letters will vary accordingly in width. The smallest letters, such as a period, will be five units wide.

The arrangement is such that the paper carriage is advanced the number of units equivalent to the "set size" of the letter last impressed on the work. For instance, if the letter "W" or a full length dash is impressed, it will be noted from Fig. 10 that a key lever member 129 will contact with a step 195 of the comb 181 and depress the comb and the yoke 182 a distance sufficient to cause the ratchet wheel 187 to advance the paper carriage a distance equivalent to eighteen units. Thus, by varying the height of the steps 185 with which the key lever members 129 coact, the paper carriage may be fed a distance required by the last character printed, such character, of course, being determined by the key depressed.

The desired length of the lines to be printed, which will be called the justified length or page length, also is divided into units of the same width as the type units, the total number of units in such lines determining their length. As the keys are depressed and a line printed, mechanism is provided which keeps count of the number of units or difference between the printed or set line and a justified or page line. When the end of a set line has been reached, it will either be the same length as a page line or some units short thereof. If it is short, it must be justified when retyped. I accomplish this justification by increasing the length of the spaces between the words, in other words, by increasing the number of units in the spaces, so that the line will completely fill space allotted to a justified or page length line. I therefore provide a mechanism which, when the last letter in the line has been printed, will indicate to the operator in what manner the line is to be retyped so that it will make a page length line.

To enable proper retyping of a set line and produce a page line, I have provided my typewriting machine with a series of space keys, and a space bar. The space bar is used for all spaces during the initial printing operation, namely, during the typing of a set line, while the space keys are only used for the reprinting operation, namely, to produce a justified or page line. When the set line is printed, a space bar 200, Fig. 1, is used. This space bar is provided with a compound key lever 121a, similar in all respects to the key levers 121. The key lever 121a engages the comb 181 in such a manner that it moves the yoke 182 to advance the paper carriage five units, and rotates the type wheels to a blank position so that no impression will result from the actuation of the type wheels.

When the operator reaches the end of the set line, it is obvious that, if there are five spaces in such line, a total of twenty-five units will have been used for the spaces. Likewise, if the printed line lacks twenty-five units of filling the alotted space, it follows that if the spaces are been ten units in width, instead of five units, as is fixed by the operation of the space bar 200, the allotted space for the line or the page line would have been completed. Likewise, if the set line lacked twenty-six units from completing a page line, it follows that had the first four spaces been ten units and the last space eleven units, a page line would have been completed.

I provide my improved typewriting mechanism with a chart C, which, when the set line has been completed, informs the operator what space keys are to be used when the line is reprinted to produce a full page line, and thus accomplish justification of the line. This chart is diagrammatically illustrated in Fig. 14. If, at the end of the set line containing five spaces there are twenty-five units left, an indicator 350 (Fig. 1) will be relatively aligned with the encircled numeral "10" on my chart. This informs the operator that when the line is retyped, the space key 205, which also bears the numeral "10", should be depressed for each space, instead of the space bar 200, which was used in typing the set line. The operator therefore prints such numerals at the end of the set line, and when retyping the line uses the space key 205, instead of the space bar 200, thus printing a complete justified page line.

In the second instance previously referred to, where the set line contains five spaces and is twenty-six units short of completing a page line, the indicator 350 will align relatively with the encircled numerals inscribed "10.4.11" of the chart. This inscription will likewise be printed at the end of the set line, and when the operator retypes the line, the space key 205, which is inscribed "10" will be depressed four times, four being the middle numeral of the three of this inscription above mentioned, and the space key 206, which bears the designation "11" will be depressed for the remaining spaces, in this instance, for the last space in the line, thus producing a complete page line.

While I have inscribed the space keys with a numeral or figure equal to the number of units which they will advance the paper carriage, and have used these units in my justification chart, it is nevertheless obvious that these space keys may be otherwise designated, as, for instance, by the letters A, B, C, D, E, etc. The space key 205 might bear the letter "A" and the space key 206 bear the letter "B". The circled inscription "10.4.11" would then read "A4B". It is therefore evident that it is not essential that the chart bear the number of units.

However, I find it convenient to inscribe the space keys and chart with numerical units, as this enables me to insert readily, upon reprinting, a large space of proper width by the operation of two or more space keys for those abnormal lines of long words, and few spaces which require such wide spacing. I provide space keys, the inscriptions of which range from 5 to 18, and most of the chart is devoted to such spacing. It will be noticed, however, from Fig. 14, that in the upper right-hand corner of the chart I have provided for spacing requiring spaces from 19 to 41 units in width. The 35 unit, for instance, could be effected by operating the 18 and the 17 space keys, and the 41 units of space on the chart could be effected by operating the 18 key twice and the 5 key once. It is only on rare occasions that spacing requiring higher than 18 units is necessary.

The application of the justification chart to the machine is best illustrated in Figs. 1, 2, 3 and 4. As there shown, it will be noted that I wrap my chart around the periphery of a cylinder or drum 201, which is splined to a shaft 202, mounted in suitable frame brackets 203. The mechanism rotates this drum about its axis, as the carriage is fed, the amount of rotation being dependent upon the unit width of the type impressed or the unit length that the carriage is fed.

It will be noted from inspection of Fig. 14 that there are seventy-one horizontal rows of indicia on the chart, each row of indicia representing one unit. While the average line is considerably longer than seventy-one units, I nevertheless find that if the line is more than seventy-one units short of completing a page line, the set line may be lengthened by the addition of another word or words, so that in practice there is seldom, if ever, more than seventy-one units which must be provided to justify a set line in order that a page line will be completed. Hence, I so arrange my mechanism that the rotary movement of the chart does not start until the set line is within seventy-one units of a complete page line, and start the rotary movement at that time. When the rotary movement starts the chart will be rotated, unit by unit, as the carriage is advanced, so that at the end of the set line it will be positioned so that the horizontal row which corresponds to the number of units difference between the set line and a page line will be in alignment with the indicator 350.

The chart C begins to rotate when the difference between the set line and the page line is seventy-one units and continues in its rotary movement until the end of the set line is reached. The chart C is rotated by the ratchet 187, which, as heretofore explained, is rotated through the medium of the comb 181 a distance equivalent to the number of units required for the characters as they are printed. The ratchet 187 is drivingly secured to its shaft 183 and this shaft, as shown in Fig. 9, extends from the ratchet or left-hand side of the machine to the right-hand side of the machine. On the right-hand end of this shaft I secure a pinion 210, arranged to mesh, as shown in Fig. 3, with a gear 214, which is drivingly secured to a shaft 212 mounted in a frame bracket 213.

Also secured to the shaft 212 is a disc 215, which is provided with a block 216 arranged to be arcuately adjusted relative to the axis of the shaft 212 and clamped in such adjusted position. The block 216 consequent upon rotation of the shaft 212 will engage a pin 217 (Fig. 4) carried by a segmental gear member 218, rotatably mounted on the shaft 212 and in driving engagement with a pinion 211, drivingly secured to the chart shaft 202. The segmental gear is normally maintained in contact with a stationary pin 219, by a weight 220, which tends at all times to rotate the chart shaft 202 in a counter-clockwise direction (Fig. 3), through the medium of a cord 221, which is secured to a pulley 222, drivingly carried by the chart shaft.

When the operator commences to type the line, the block 216 is in the dotted line position indicated in Fig. 3, and as the ratchet 187 moves to progress the paper carriage, it causes the rotation of the disc 215 in the direction of the arrow of Fig. 3, and when the set line is 71 units short of the standard line, the block 216 engages the pin 217. Subsequent movement of the ratchet will therefore advance the segmental gear 218 in a counter-clockwise direction, thereby rotating the chart.

When the end of a set line is reached, that horizontal row of indicia carried by the chart, which corresponds to the number of units of difference between the set line and a page line, will align with the stationary indicator 350. As heretofore explained, the indicia on the chart now indicate to the operator which space key or keys should be used when retyping the line to produce a justified page line. The paper carriage and the chart are returned to their normal position after the end of the set line has been reached, as will hereinafter be described.

The chart drum is advanced axially to the right in Fig. 4, from one vertical column of indicia on the chart to another vertical column, each time the space bar 200 is depressed. The total number of columns by which the chart is advanced is equal to the total number of spaces in the set line. To this end, I journal a yoke 230, as shown in Fig. 1, to the chart drum 201, and to each end of the yoke I secure an arm 231 (Fig. 4). These arms, at their upper ends, are provided with notches arranged to be engaged by a transversely extending stationary bar 232, carried by the frame brackets 203, and thereby prevent rotation of the yoke about the axis of the chart drum.

Rigidly secured to the yoke 230 is a rack 223, which is arranged to be advanced (moved to the right in Fig. 4) by a pawl 233. This pawl is pivotally mounted as at 234 to a suitable frame bracket, and is operated by a bell crank 235 (Figs. 1 and 3), which is pivotally connected to a lever 236, mounted as at 237, to a suitable frame bracket. The lever 236 is moved upwardly, that is, counter-clockwise above its pivot 237, by a link 238, which has an arm 239 (Fig. 1), overlying the members 129 of the combined spaced key lever mechanisms. This arm 239 is arranged so that consequent upon the depression of either a space bar or any space key, the lever 236 will be rocked upwardly, causing the pawl 233 to advance the rack the distance of one tooth thereof, moving the chart drum 201 along its axis from one vertical line of indicia thereon to the next vertical line.

The pawl 233 is reset by the shaft 159. A suitable connecting rod 242 is, as shown in Fig. 5, journalled to the cam portion 170 of such shaft and is connected by a pin and slot connection 243 with the pawl operating lever 236 (Figs. 3 and 5), thus resetting the pawl after each operation thereof. Movement of the rack bar is prevented while the pawl is being reset by the usual spring-pressed detent pawl 246 (Fig. 4). The rack bar is normally maintained in engagement with the detent pawl by a weight 247 (Fig. 1) which is secured to the arm 231 of the chart drum by a suitable cord 248 passing over a pulley 249.

The chart is returned to its original or starting position when the end of a line is reached by the depression of a key 250 (Fig. 1). This key is carried by a lever 251, which is pivoted as at 252 to a frame bracket, and which is provided with a yoke 253 arranged to engage a pin 254 carried by a clutch shifter fork 255. This fork, consequent upon the depression of the key 250, moves a disc 260 (Fig. 4) into engagement with a constantly driven frictional driving disc 261, which is driven in any suitable manner from the motor M, as, for instance, by suitable pulleys 262, and a driving belt 263. This, as will be hereinafter explained, rotates the drum to its original starting position and returns the paper carriage.

The movement of the shifter fork 255, due to the depression of the key 250, acts through the medium of a flexible control wire 265 to cause a button 266 on the other end of the wire to engage the detent pawl 246, causing it to move away from the rack 223, permitting the weight 247 to return the chart drum to its normal or left-hand position (Fig. 4).

The depression of the key 250, due to establishment of a driving connection between the friction disc 260 and the driving disc 261, as heretofore explained, causes the shaft 270, which drivingly supports the driven disc 260, to be rotated. Suitable intermeshing pinions 271 and 273 (Fig. 3), one of which is carried by such shaft and the other of which meshes with a gear 272, which is drivingly connected to the ratchet shaft 183, serve to drive the shaft 183 in a reverse direction, thereby returning the segmental gear 218 and the chart C to their original angular positions relative to their axes. Thereupon, the ratchet 187, through its gearing 193, heretofore mentioned, returns the paper carriage to its normal position.

The chart C is moved when the line is retyped in the same manner as heretofore described in connection with the first typing of the line. For this purpose, it will be noted that, the lever 239, which actuates the mechanism to move the chart axially, overlies all space key levers. This movement of the chart during retyping of the line has two advantages; first, a pointer 420 carried by the chart, as, for instance, the left hand drum flange 420 (Fig. 4) coacts with a stationary chart 421 carried by the frame members 203 and indicates to operator the number of the next space to be set; and secondly, due to both axial and radial movements of the chart C, a check is had at the end of the retyped line which should be complete. Hence, if at the end of the retyped line chart indicia other than that indicated in the bottom row, as shown in Fig. 14, namely, the numeral "5" appears in the indicator 350, the operator is warned that an error has been made.

The return of the paper carriage is permitted by the release of the detent pawl 188, which ordinarily prevents clockwise rotation of the ratchet 187. A flexible wire control member 280 is secured to the key lever 251 and consequent upon the depression of the key 250 rocks a pivoted bell crank 283 (Fig. 2) counter-clockwise, causing a pin carried thereby to rock the pawl 188 to withdraw it from engagement with the ratchet wheel 187.

I also provide my typewriting mechanism with a tabulator, which permits the paper carriage to be advanced to predetermined positions in a manner similar to the tabulator of the ordinary typewriter. Such advance takes place without the operation of the space or character keys and without making any impressions on the work sheet. As shown in Figs. 1 to 4 and 12, I mount a rod 290 on the carriage frame bracket 44, immediately above the left-hand guideway 23 thereof. Adjustably positioned on this rod are a series of stop members 291, adapted to be clamped in position by suitable clamp set screws 292.

The stops 291 act to stop the movement of the carriage in a predetermined position consequent upon the depression of a tabulator key 294. The depression of this key, as shown in Figs. 1, 4 and 11, rocks the key lever 251, heretofore described, in a clockwise direction, shifting the clutch fork 255 to bring a friction disc 293 into engagement with the frictional driving wheel 261 heretofore described. This causes the shaft 270 which supports the discs 293 and 260 to move the paper carriage in a forward direction, such direction being indicated by an arrow in Fig. 1. The driving mechanism between the shaft 270 and the paper carriage is the same as heretofore described in connection with the carriage return, the only difference being in a reverse movement of the various members of the mechanism due to the substitution of the disc 293 for the disc 260 previously described as driving the shaft 270.

The depression of the tabulator key brings a pivoted latch 297 into position to engage a stop 291 and thereby stop the movement of the carriage, which was initiated by the tabulator key. As illustrated, the depression of the tabulator key also acts on the wire 280 heretofore described, to operate the detent pawl release 283, rocking this release lever 283 clockwise, causing it to engage a button head 295, of a flexible wire control member 296, causing such member, as shown in Fig. 12, to rock a pawl 297 in a counter-clockwise direction, into position to engage a stop 291. The engagement of the pawl with a stop 291 prevents further movement of the carriage. The friction clutch arrangement 293 and 261 permits such stopping of the carriage to take place without damage to the various mechanisms. When the carriage is advanced by the tabulator, the ratchet shaft 183, which, as heretofore explained, is a part of the carriage propelling mechanism, is rotated and hence the justification chart C will be properly positioned.

As heretofore mentioned, each type wheel 14 carries on its periphery two sets of type, T, and t, the type t being arranged in one annular line or row and the type T being arranged in another annular row closely adjacent thereto. The keyboard, it will be noted from Fig. 1, is marked with upper case characters only. However, these may represent, for practical purposes, either upper or lower case. In the embodiment illustrated, I position the upper case row of characters at the right-hand side of the type wheel (Fig. 5) and the lower case characters on the left-hand side of the type wheels.

When the type wheel carriage 71 is moved to position a different row of type relative to the platen, as will be hereinafter more fully described, the precision stop 169 is also moved in the same direction by a pin 351 carried by the stop, which is in constant engagement with a yoke 352 carried by the carriage. This insures the proper positioning of each type regardless of which row of type is in the operating position. The arrangement of the stop 169 and its index wheel 101 is such that the type wheels are always stopped with the rearmost edge of each type on a line passing through the axis of the type wheels and through the point of tangency between the type wheels and the platen. Thus, I am enabled to advance the platen and paper feeding mechanism after each impression takes place.

A shift key 300, conveniently located on the keyboard, as illustrated in Fig. 1, is used to shift the type wheels, together with their inking mechanism to the left (Fig. 5), moving the type t out of registration with the platen 12 and the type T into registration therewith. As shown in Fig. 4, the shift key 300 is mounted on a plunger 301, which is normally maintained in an uppermost position, by a suitable spring not shown. Consequent upon the depression of the key 300 a contractor 303 strikes a switch 304, causing the energization of a solenoid 306, which is connected with the switch by a conductor 305. The energization of the solenoid causes the core 307 thereof to rock a lever 308, (Figs. 1 and 4) in a clockwise direction. This lever, through the medium of a link 309, rocks a lever 310, which is secured to a shaft 311, rotatively mounted in the frame. The movement of the lever 310 is transmitted to the frame 71 which supports the type wheels and their inking mechanism, by a link 312, which is pivotally connected to the lever 310 by an adjustable link 314.

When the type wheels are moved to position the upper case characters in the printing position, the comb 181 is also moved from the full line position to the dotted line position, as indicated in Fig. 10, the reason for this being that the upper case characters are of a different width than the corresponding lower case characters, and the justification chart C must therefore be moved a different distance. By moving the comb 181, I am able to provide a second series of steps thereon, which will be moved into position to coact with the respective character keys when the shift key is moved. Thus the justification chart will be advanced the proper distance when the shift key is operated. This, of course, eliminates the necessity of providing both upper and lower case characters on the keyboard.

The comb 181 is moved from the full line to the dotted line position, by the shaft 311, heretofore mentioned in connection with the type wheel shift mechanism. Rigidly secured to the shaft 311 is a shifter fork 315, arranged to engage the yoke 182 which supports the comb and moves it toward the right, Fig. 9, against the action of a compression spring 316, which otherwise maintains the comb in its normal or left-hand position.

When it is desired to shift from one type wheel to another, that is, from say type of eight-point width to type of twelve-point width, the type wheels are moved toward the left in Fig. 5, so as to bring the type wheel 14a into the same relative position as the type wheel 14 is shown. For this purpose I use the manually adjustable link 314, heretofore mentioned. As shown, this link interconnects the lever 310 with the link 312, to cause the type wheels to be moved to position the type wheels for either upper or lower case characters.

As shown in Fig. 1, the adjustable link is pivotally connected to the link 312, by a permanent pivot 320, and is provided with three openings 321, arranged to receive a pin or plunger 322, which may be adjustably positioned in any one of the openings by the operator, to secure the link 314 to the lever 310 in any of three positions, each of which is arranged to shift its respective type wheel into operative relationship relative to the platen.

When the shift is made from one type wheel to another, it follows that the paper feed carriage and the justification chart must be advanced a different amount for the twelve-point type than it was an an eight-point type. However, I find it desirable to make the ratio of the widths of the various characters relative to each other the same in every font, regardless of point size, and I arrange my mechanism so that the same comb and the chart will control the advance of the paper carriage and indicate to the operator the space keys which must be struck on the reprinting operation to give a justified copy. Thus, I am able to use one scale or chart C to compute the shortage for all set widths of type. This is accomplished through the medium of the change speed gearing 193, heretofore mentioned.

The change speed gearing is best shown in Figs. 9, 11 and 13, and comprises a series of gears 330, which are keyed, as a unit, to the ratchet shaft 183, and which mesh respectively with individually rotatable gears 331, journalled on a shaft 332, carried by a frame bracket 333. Each of these gears has, as shown in Fig. 13, a keyway 334, arranged to receive a pin 335, which is carried by the shaft 332, consequent upon axial movement of the shaft, thereby drivingly connecting any one of the pairs of gears with such shaft. A spring-pressed ball 336 carried by the frame bracket 333 is arranged to enter annular recesses 337 in the shaft to maintain the pin 335 in an adjusted position. The shaft 332 is drivingly connected to the gear 46, by a gear 338, which is splined to the shaft 332 in any suitable manner, thus, even though the comb causes the ratchet to be advanced the unit of one width, the carriage may nevertheless be advanced the unit of an entirely different width to provide for the different points of the type, and as the angular movement or amount of rotation imparted to the shaft 183 remains unchanged, the chart C need not be changed, as while it represents units difference between a set line and a page line, it nevertheless is unaffected by a change in width of the units as long as the same length unit is used for the carriage advance for the entire set line.

To facilitate the operation of the machine, I have provided a copyholder 450, Figs. 1 and 2. As there illustrated, the copyholder comprises a roller about which the sheet to be copied may be wound. The arrangement is such that the sheet may be passed from the left (Fig. 2) to the bottommost surface of the roll, with which it is maintained in contact by a suitable shield 451, and thence around the roll and rearwardly between the chart C and the frame 10.

In Figs. 15 to 18 inclusive, I have shown a modified form of mechanical shift mechanism which, consequent upon the operation of a shift key 300, causes the type wheel carriage to be mechanically shifted to position a type wheel 14 to print either upper or lower case characters as desired. The shift key 300a is mounted on a plunger 360 slidably mounted in the frame 10 adjacent the keyboard and is normally maintained in its uppermost position by a suitable spring 361. When the key is depressed, the plunger rocks a lever 362 about its pivot 363, against the action of a spring 366, causing a yoke 364 to permit a one-half revolution clutch 365 to become active.

The driven member of the clutch 365 is connected with the constantly rotating shaft 125, heretofore described. The driving member of this clutch carries an eccentric pin 367, which, when the clutch is rendered active consequent upon the depression of the key 300a, moves from the position shown in Figs. 15 and 16 to a diametrically opposite position. This pin 367 is connected, by a universal pivotal connection 368, to one end of a link 369, the other end of which is connected by a universally pivotal connection 370 with one arm of a bell crank 371. The other arm of this bell crank is connected by links 372 to the lever 308, heretofore described in connection with the solenoid operated shift mechanism. The lever 308 is pivoted to the machine frame 10, as at 373, and is connected by the linkage 310, 312 and 314, heretofore described, with the type wheel carriage 78.

The arrangement of the various links is such that the depression of the key 300a causes the carriage 78 to be slid to the right (Fig. 1) to align the upper case or right-hand type (Fig. 5) of the type wheel with the platen 26. The key 300 may be retained in a depressed position by a suitable manually releasable latch, generally indicated at 374 in Fig. 15. The release of the latch 374 permits the springs 361 and 366 to return the key 300a and the lever 366 to their normal positions as shown in Fig. 15. The return of the lever 366 causes the clutch 365 to become active to rotate its driving member one-half a revolution, thereby returning the shift linkage mechanism and the carriage to their original positions, indicated in Figs. 5 and 15.

The half-revolution clutch 365 comprises, as shown in Figs. 17 and 18, a driven member 376, which is pinned to the constantly rotating shaft 125, and a driving member 377, which carries the eccentric pin or crank 367, heretofore described. The driven member has an annular flange 378, which embraces the hub of the driving member 377, as shown in Fig. 17. Interposed between this flange and the driving member are a series of rollers 378, spaced apart from each other by lugs 379, of a clutch ring 380. These rollers coact with cam surfaces 381 of the driving member 377 in the usual manner, as illustrated. Suitable springs 382 and 383 (Figs. 18 and 16) normally act to cause the rollers to be wedged between such cam surface and the driven member of the clutch, causing all parts of the clutch to rotate as a unit. When, however, an abutment is brought into contact with an ear 384 of the clutch ring, the rollers are forced out of wedging contact with the driving and driven members of the cltuch and the driven member 376 of the clutch rotates alone.

To control the clutch so that it rotates through one-half a revolution for each operation of the clutch lever 362, the latter is forked, as shown in Fig. 15. One leg of the fork of the clutch lever is provided with a hook 385 to engage the clutch ring and the other leg of the fork has an abutment 386 to engage the ring 377 diametrically opposite the point of its engagement by the hook 385. Thus, when the lever is rocked clockwise about its pivot (Fig. 15) the hook 385 moves out of engagement with the clutch ring and the abutment 386 moves into its path, the clutch will become active to move the driving member and clutch ring one-half a revolution or until the clutch ring is engaged by the abutment which again breaks the driving connection in the clutch. Similarly the clutch is rendered active for one-half a revolution when the lever 362 moves in a counterclockwise direction about its pivot, due to the release of the shift key 300a.

I claim:

1. In a printing machine, a plurality of typeholders each carrying a font of type, certain type of each font varying in width from other type in the same font, and wherein the width of the type of one font all bear the same ratio to the width of corresponding type in another font, a workholder, key-operated means to progress the workholder a distance equivalent to the width of the type impressed on the work, said last-named means including a change speed gear mechanism whereby one key may be utilized to progress the workholder for corresponding type on any type holder.

2. The combination of a plurality of type wheels, the different wheels having the same characters similarly arranged on the respective wheels, the width of the characters on one wheel differing from the width of the corresponding characters on another wheel but the width ratio of the characters to each other being the same on any one wheel, a keyboard having a one set of keys corresponding to the characters, shift mechanism for rendering active one wheel or another for use by the keyboard to print characters in a row, means for causing spaces between words so printed, indication mechanism controlled by the number of spaces and the variation in the length of the line from a given standard to indicate to the operator the proper size of space to be inserted when the line is rewritten to make it of such standard length, and change speed gearing to enable said indication mechanism to operate with any of the type wheels.

3. In a printing machine, a plurality of typeholders each carrying a font of type, a paper carriage, key-operated means to impress the paper and feed the carriage a distance equivalent to the width of the type impressed on the work, said last-named means including a change speed mechanism, a justification scale and means operative by said keys independent of said change speed mechanism to set said scale.

4. In a typewriting machine having a plurality of series of type, the type of one series being of a different set size than the type of another series, means to cause a predetermined type of one series to make an impression on a work sheet, a workholder, means to progress the workholder a distance determined by width of the type impressed, a series of space keys including a standard space key, each of said keys adapted to advance the workholder to space words a different distance apart than the other space keys, a justifying scale, means cooperating with such scale to indicate what space keys should be used to cause a set line to be lengthened to become a standard line upon retyping of such line, and means to operate said scale to indicate the space key to be used, regardless of which series of type are active.

5. In a printing machine, a pair of typeholders each carrying a font of type characters, the characters on one font corresponding to the characters on the other font but being of a different width, means to select a type from either font to cause it to be impressed on the work, means to advance the work relative to the type holders a distance equivalent to the width of the type character impressed, a chart, an indicator therefor, means to cause a predetermined relative movement between the chart and the indicator for each type character impressed, the distance of such movement being the same for corresponding characters regardless of the width of such character.

6. In a printing machine, a pair of type holders each carrying a font of type having characters corresponding to the characters of each other font but wherein the width of one type in a font varies from the corresponding type in the other font, and wherein the width of the type in one font all bear the same ratio to the width of corresponding type in the other font, a work holder, a set of keys, each key corresponding to the characters of one font, said font being selectively positioned for cooperation with the work carried by said workholder, means to cause one key to position its corresponding type of the active font for cooperation with the work regardless of which font is active, means operated by said keys to cause relative movement between the work holder and the type holders to relatively advance the work a distance equivalent to the width of the active type, said last named means including a settable driving connection whereby one key may be utilized for corresponding type on either type holder, a movable chart, an indicator, and means to cause a predetermined relative movement between the indicator and the chart for each character imprinted, the amount of such movement being the same for corresponding characters regardless of which font of type is active.

7. In a printing machine, a plurality of fonts of type, certain type of each font varying in width from other type in the same font and corresponding type in the different fonts varying in width from each other, a work holder, key operated means to progress the work holder a distance equivalent to the width of the type impressed on the work, and change-speed mechanism whereby one key may be utilized to progress the work holder for corresponding type on either font.

8. In a printing machine, at least two fonts of type, corresponding type in the two fonts varying in width from each other, a paper carriage, key operated means to cause the type to impress the paper and feed the carriage a distance equivalent to the width of the type impressed on the work, change-speed mechanism, a justification scale, and means operated by the keys to set said scale independently of the change-speed mechanism.

CLIFTON CHISHOLM.